(12) United States Patent
Kahle et al.

(10) Patent No.: US 6,766,442 B1
(45) Date of Patent: Jul. 20, 2004

(54) PROCESSOR AND METHOD THAT PREDICT CONDITION REGISTER-DEPENDENT CONDITIONAL BRANCH INSTRUCTIONS UTILIZING A POTENTIALLY STALE CONDITION REGISTER VALUE

(75) Inventors: James Allan Kahle, Austin, TX (US); Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,992

(22) Filed: Mar. 30, 2000

(51) Int. Cl.[7] .................................................. G06F 9/00
(52) U.S. Cl. ...................................... 712/239; 712/233
(58) Field of Search ................................. 712/233, 239

(56) References Cited

U.S. PATENT DOCUMENTS

| | | | | |
|---|---|---|---|---|
| 4,435,756 A | * | 3/1984 | Potash .......................... | 712/237 |
| 4,439,828 A | | 3/1984 | Martin | |
| 5,193,167 A | | 3/1993 | Sites et al. | |
| 5,454,117 A | | 9/1995 | Puziol et al. | |
| 5,515,518 A | | 5/1996 | Stiles et al. | |
| 5,530,825 A | * | 6/1996 | Black et al. ................. | 711/213 |
| 5,553,255 A | * | 9/1996 | Jain et al. ................... | 712/235 |
| 5,687,360 A | * | 11/1997 | Chang ......................... | 712/240 |
| 5,752,014 A | | 5/1998 | Mallick et al. | |
| 5,758,142 A | | 5/1998 | McFarling et al. | |
| 5,794,028 A | * | 8/1998 | Tran ............................ | 712/240 |
| 5,794,063 A | | 8/1998 | Favor | |
| 5,933,628 A | * | 8/1999 | Chang ......................... | 712/233 |
| 6,092,187 A | | 7/2000 | Killian | |
| 6,105,098 A | | 8/2000 | Ninose et al. | |
| 6,230,261 B1 | | 5/2001 | Henry et al. | |
| 6,247,122 B1 | | 6/2001 | Henry et al. | |
| 6,374,349 B1 | | 4/2002 | McFarling | |
| 6,421,774 B1 | | 7/2002 | Henry et al. | |
| 6,499,101 B1 | | 12/2002 | Henry et al. | |

OTHER PUBLICATIONS

Hennessy, John L. and Patterson, David A. Computer Architecture: A Quantitative Approach. Second Edition. San Francisco, CA: Morgan Kaufmann Publishers, Inc. ©1996. pp. 232 and 251–261.*
Computer Dictionary Second Edition: The Comprehensive Standard for Business, School, Library, and Home. Redmond, Washington: Microsoft Press, ©1994. p. 253.*

* cited by examiner

Primary Examiner—Eddie Chan
Assistant Examiner—Aimee J. Li
(74) Attorney, Agent, or Firm—Volel Emile; Diana L. Roberts; Dillon & Yudell LLP

(57) ABSTRACT

A processor having improved branch prediction accuracy includes at least one execution unit that executes sequential instructions, a condition register, and a branch prediction circuit that predicts a condition register-dependent branch instruction by reference to a potentially stale condition register value to produce a speculative instruction fetch address. In a preferred embodiment, the processor includes branch execution circuitry that subsequently determines if the speculative instruction fetch address is correct by reference to a non-stale value of the condition register.

3 Claims, 2 Drawing Sheets

PROCESSOR AND METHOD THAT PREDICT CONDITION REGISTER-DEPENDENT CONDITIONAL BRANCH INSTRUCTIONS UTILIZING A POTENTIALLY STALE CONDITION REGISTER VALUE

CROSS-REFERENCE TO RELATED APPLICATIONS

This application is related to the following co-pending applications, which are filed on even date herewith and incorporated herein by reference:

(1) U.S. application Ser. No. 09/538,993; and (2) U.S. application Ser. No. 09/538.991.

BACKGROUND OF THE INVENTION

1. Technical Field

The present invention relates in general to data processing and, in particular, to branch prediction within a data processing system. Still more particularly, the present invention relates to a processor and method of branch prediction that predict a condition register-dependent conditional branch instruction utilizing a stale condition register value.

2. Description of the Related Art

A state-of-the-art superscalar processor can comprise, for example, an instruction cache for storing instructions, one or more execution units for executing sequential instructions, a branch unit for executing branch instructions, instruction sequencing logic for routing instructions to the various execution units, and registers for storing operands and result data.

Branch instructions executed by the branch unit of the superscalar processor can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch in program flow specified by an unconditional branch instruction is always taken. In contrast, conditional branch instructions are branch instructions for which the indicated branch in program flow may be taken or may not taken depending upon a condition within the processor, for example, the state of a specified condition register bit or the value of a counter.

Conditional branch instructions can be further classified as either resolved or unresolved, based upon whether or not the condition upon which the branch depends is available when the conditional branch instruction is evaluated by the branch unit. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively execute unresolved branch instructions by predicting whether or not the indicated branch will be taken. Utilizing the result of the prediction, the instruction sequencing logic is then able to speculatively fetch instructions within a target execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined by a compiler prior to program execution, or dynamic branch prediction, which predicts resolutions of branch instructions by reference to branch history accumulated on a per-address basis within a branch history table. More recently, even more elaborate two-level branch prediction methodologies have been proposed that utilize a first level of branch history that specifies the resolutions of the last K branch instructions to index into a second level of branch prediction storage that associates a resolution prediction with each (or selected ones) of the $2^{K-1}$ possible branch history patterns.

While conventional static and dynamic branch prediction methodologies have reasonably high prediction accuracies for some performance benchmarks, the severity of the performance penalty incurred upon misprediction in state-of-the-art processors having deep pipelines and high dispatch rates makes it desirable to improve prediction accuracy.

SUMMARY OF THE INVENTION

In accordance with the present invention, a processor having improved branch prediction accuracy includes at least one execution unit that executes sequential instructions, a condition register, and a branch prediction circuit that predicts a condition register-dependent branch instruction by reference to a potentially stale condition register value to produce a speculative instruction fetch address. In a preferred embodiment, the processor includes branch execution circuitry that subsequently determines if the speculative instruction fetch address is correct by reference to a non-stale value of the condition register.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
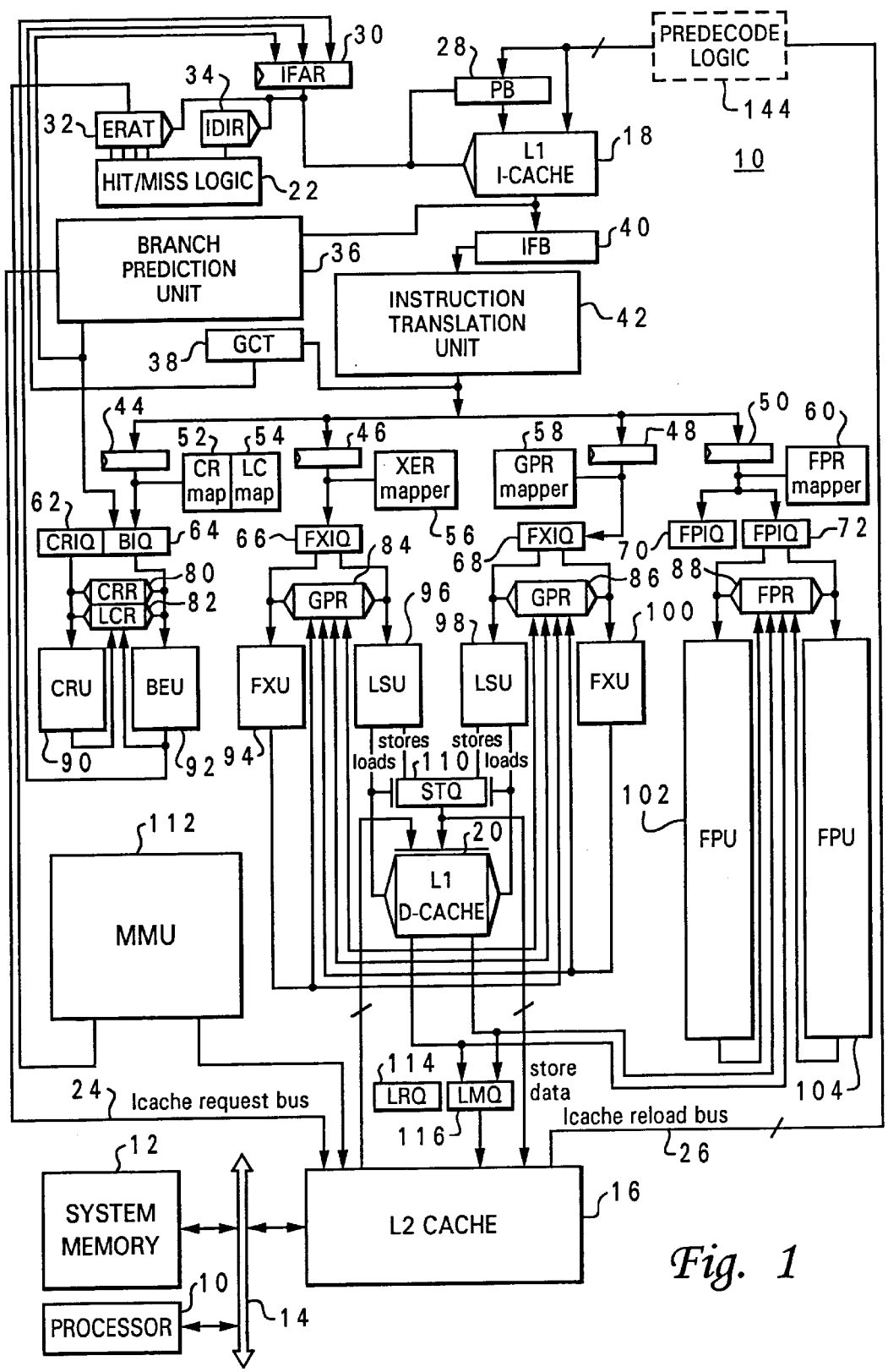
FIG. 1 depicts an illustrative embodiment of a data processing system with which the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as computer system.

Processor 10 has an on-chip multi-level cache hierarchy including a unified level two (L2) cache 16 and bifurcated level one (L1) instruction (I) and data (D) caches 18 and 20, respectively. As is well-known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative path addresses resulting from the prediction of conditional branch instructions, global completion table (GCT) 38, which provides non-speculative sequential path addresses, and branch execution unit (BEU) 92, which provides non-speculative addresses resulting from the resolution of incorrectly predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. As discussed in detail below with respect to FIG. 2, BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be dispatched and executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched to one of latches 44, 46, 48 and 50, possibly out-of-order, based upon instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically to the execution units of processor 10 for execution as long as data dependencies and antidependencies are observed. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the execution unit, which writes back the result data, if any, from the assigned rename register(s) to one or more architected registers within the appropriate register file. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction, the effective address computed by executing the load instruction is translated to a real address by a data ERAT (not illustrated) within Memory Management Unit (MMU) 112 and then provided to L1 D-cache 20 as a request address. At this point, the load instruction is removed from FXIQ 66 or 68 and placed in load reorder queue (LRQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12. LRQ 114 snoops exclusive access requests (e.g., read-with-intent-to-modify), flushes or kills on interconnect fabric 14 against loads in flight, and if a hit occurs, cancels and reissues the load instruction.

Store instructions are similarly completed utilizing a store queue (STQ) 110 into which effective addresses for stores are loaded following execution of the store instructions. From STQ 110, data can be stored into either or both of L1 D-cache 20 and L2 cache 16.

Figure 2:
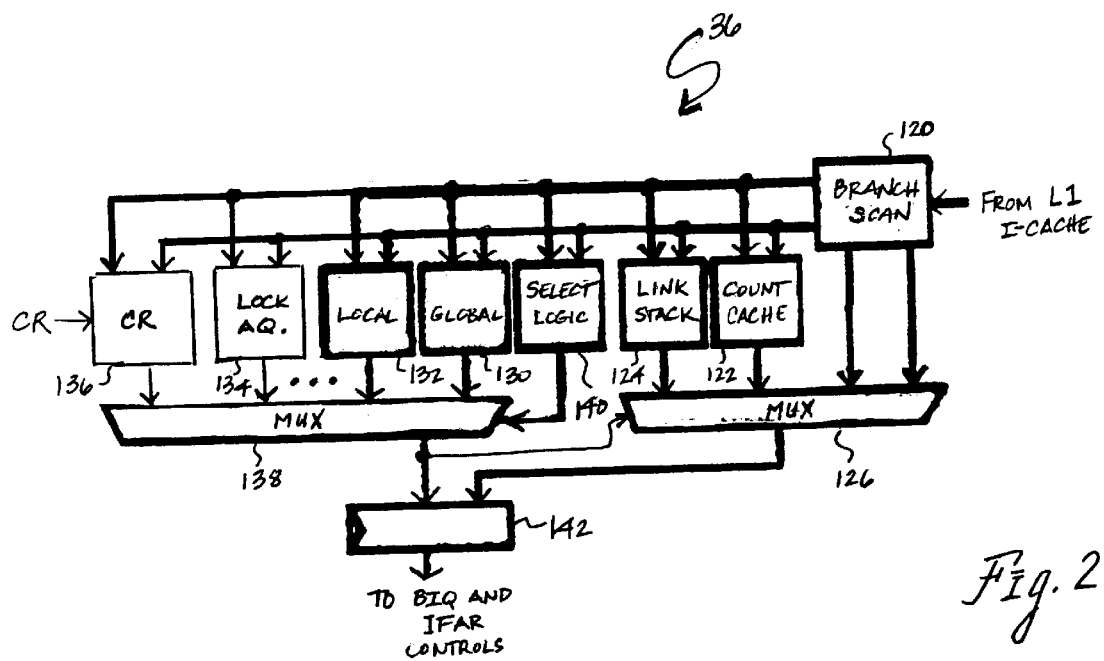
FIG. 2 is a more detailed block diagram of the branch prediction unit (BPU) of FIG. 1.

Referring now to FIG. 2, there is depicted a more detailed block diagram of an illustrative embodiment of BPU 36 from FIG. 1. BPU 36 includes branch scan logic 120 that receives cache lines of instructions output by L1 I-cache 18 and scans the cache lines for UISA branch instructions. Branch instructions detected by branch scan logic 120 are decoded and then routed by branch scan logic 120 according to the type of branch instruction. Branch scan logic 120 can output up to two branch instructions per cycle.

As will be appreciated, prediction of branch instructions can involve both direction prediction (e.g., taken or not taken) and address prediction. BPU 36 concurrently performs both direction and address prediction as follows. Conditional branch instructions that depend upon the state of the link register or the count register are respectively output to link stack 124 and count cache 122 for address prediction. The address for the predicted path (e.g., either the branch target address or the next sequential instruction address) forms an input of multiplexer 126. Address prediction for other conditional branch instructions or for unconditional branch instructions (i.e., branch instructions indicating a branch in program flow that is always taken) is performed directly by branch scan logic 120, and the branch target addresses for these other types of branch instructions similarly form inputs of multiplexer 126. In response to the outcome of the direction prediction described below, multiplexer 126 selects the appropriate one of its input addresses as a predicted path address that is latched by output latch 142, and from there provided to the control of both BIQ 64 and IFAR 30, as discussed above.

Branch scan logic 120 routes conditional branch instructions to branch prediction circuits 130–136 for direction prediction. In a preferred embodiment, each of branch prediction circuits 130–136 generates a direction prediction (taken or not taken) for the conditional branch instruction and provides the direction prediction to multiplexer 138. Select logic 140 then selects one of the direction prediction presented at the inputs of multiplexer 138 as an output that is latched by output latch 142, and from output latch 142 sent to the control of BIQ 64 and IFAR 30. Of course, in an alternative embodiment, select logic 140 could be configured to select only one of branch predictions circuits 136–142 to perform a direction prediction for a given conditional branch instruction.

In the depicted illustrative embodiment, the branch prediction circuits of BPU 36 include a global branch prediction circuit 130 that predicts the direction of a conditional branch instruction by reference to a branch pattern table accessed by a vector of bits indicating the previous N (e.g., 12) conditional branch resolutions (i.e., taken or not taken). In addition, the branch predictions circuits include a local branch prediction circuit 132 that accesses a branch history table (BHT) utilizing the instruction address of the conditional branch instruction to be predicted as an index into the BHT. The branch prediction circuits further include a lock acquisition branch prediction circuit 134 and a condition register branch prediction circuit 136, which are each specifically designed to predict a path direction for conditional branch instructions that depend upon a particular type of underlying condition and/or occur in a particular instruction context defined by one or more instructions adjacent to or surrounding the branch instruction. Thus, lock acquisition branch prediction circuit 134 is designed to provide path predictions for conditional branch instructions that often terminate lock acquisition instruction sequences, and condition register branch prediction circuit 136 is designed to provide path predictions for conditional branch instructions that depend upon the state of one or more fields within the CR. As indicated by ellipsis, BPU 36 may also include additional branch prediction circuits that are designed to predict the direction of conditional branch instructions having other defined types of underlying conditions or instruction contexts.

The type of the underlying branch condition and/or the instruction context can be determined by either or both hardware and software. Thus, the branch condition type and/or the instruction context can be detected either statically (i.e., before program execution) by program restructuring software (such as a compiler) or dynamically during program execution by predecode logic 144 interposed between L2 cache 16 and L1 I-cache 18, as shown in FIG. 1, or by branch scan logic 120. For example, a typical lock acquisition sequence of instructions is as follows:

| A | larx B | ! | load-reserve of variable |
|---|--------|---|--------------------------|
|   | ...    | ! | other instruction(s)     |
|   | bc C   | ! | compare-and-swap conditional branch |
|   | stcx B | ! | store conditional targeting reserved variable |

-continued

| | bc A | ! | conditional branch dependent upon a CR bit set if stcx was successful |
| C | add | ! | next sequential instruction following lock acquisition sequence |

In accordance with the present invention, either the hardware or the software described above can identify "bc A" as a branch terminating the lock acquisition sequence by reference to one or more of the preceding instructions. If the CR bit upon which "bc A" depends is set, execution should continue at the next sequential instruction address (i.e., the add instruction); however, if the CR bit is reset, meaning that the store-conditional failed, execution should branch back to the load-reserve instruction "larx B." Hardware or software can also readily identify other conditional branch instructions that depend upon the state of a CR bit but that are not part of a lock acquisition sequence by decoding the instruction type or by examining the operands of the conditional branch instruction.

Figure 3:
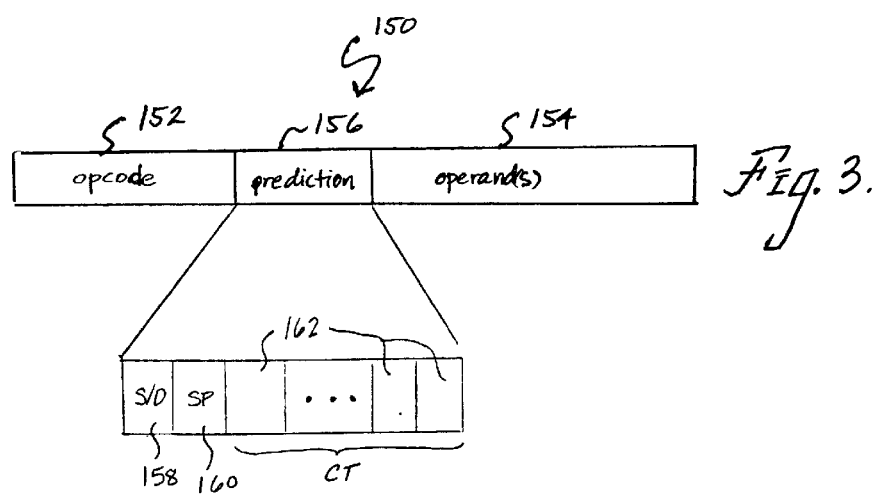
FIG. 3 illustrates an exemplary embodiment of a conditional branch instruction including a prediction field in accordance with the present invention.

Once the underlying condition or instruction context has been determined, an indication of the underlying condition or instruction context is preferably provided to select logic 140, for example, encoded within the branch conditional instruction. With reference now to FIG. 3, an exemplary conditional branch instruction 150 is depicted that, in addition to conventional opcode and operand fields 152 and 154, includes a prediction field 156 for conveying condition type/instruction context information. As shown, prediction field 156 includes an S/D bit 158 that can be set (e.g., to "1") by a compiler to indicate that conditional branch instruction 150 should be predicted according to the prediction (i.e., taken or not taken) indicated by the state of static prediction (SP) bit 160. Prediction field 156 further includes one condition type (CT) bit 162 for each respective condition type/instruction context. Thus, when S/D bit 158 is reset (e.g., to "0"), select logic 140 can determine the condition type/instruction context, if any, of conditional branch instruction 150 and, based upon that determination, can select the appropriate speculative path address to supply to IFAR 30 and BIQ 64. For example, if the CT bit 162 corresponding to a lock acquisition branch is set and S/D bit 158 is reset, select logic 140 will select the speculative path address output by lock acquisition branch prediction circuit 134; and if the CT bit 162 corresponding to a CR-dependent branch is set and S/D bit 158 is reset, select logic 140 will select the speculative path address output by CR branch prediction circuit 136. Because instruction traces indicate that lock acquisition sequences are typically successful (i.e., the lock is successfully acquired), lock acquisition branch prediction circuit 134 is preferably heavily weighted toward producing the not-taken (i.e., sequential) path as the speculative path address.

Depending upon the desired embodiment, local and global branch prediction circuits 132 and 130 can be implemented similarly to or differently from than the remainder of branch prediction circuits 130–136. In one embodiment, each of local and global branch prediction circuits 130 and 132 may have a respective associated bit within prediction field 156 just like branch prediction circuits 134 and 136. Alternatively, prediction field 156 may contain no bits corresponding to local and global branch prediction circuits 132 and 130, and select logic 140 may select one of the direction predictions output by these branch prediction circuits only when another of the branch prediction circuits is not indicated within prediction field 156. Such selection by selection logic 140 could then be based upon some measure of branch prediction accuracy for each of local and global branch prediction circuits 132 and 130.

Turning now more specifically to prediction of CR-dependent conditional branch instructions, the present invention recognizes that conventional processors implement an interlock between the generation of the CR bits upon which the branch depends (e.g., the generation of GT, LT, and EQ by a compare instruction) and the resolution of the conditional branch instruction. As noted above, in the absence of the availability of the required CR bit(s), such CR-dependent conditional branch instructions are typically predicted by reference to a branch history table or the like. Underlying this conventional approach is an assumption that the CR-dependent conditional branch instructions will sometimes or often be resolved prior to the need to predict or execute the conditional branch instructions, particularly if the compiler is designed to separate as widely as possible the compare or other "recording" instruction that generates the CR bit(s) and the CR-dependent conditional branch instruction.

In contrast to such conventional approaches, the present invention recognizes that, given processor clock speeds approaching and surpassing 1 GHz, it is impractical and possibly harmful to performance for a compiler to restructure programs to separate CR-bit-producing instructions and CR-dependent conditional branch instructions because the relevant CR bit(s) are physically too far away from the branch prediction logic to arrive in time to resolve CR-dependent conditional branch instructions. For example, assuming a processor clock frequency of 1 GHz or more, the contents of a CR rename register may require as many as 10 cycles to be communicated from CRR 80 to BPU 36.

Accordingly, as shown in FIG. 2, a preferred embodiment of CR branch prediction circuit 136 utilizes the most recently available contents of the architected CR within CRR 80 rather than the actual value of the CR bit(s) upon which a CR-dependent conditional branch instruction depends (which is/are typically within a CR rename register) to predict the direction of a CR-dependent conditional branch instruction. Utilizing this branch prediction methodology, three scenarios are possible. First, the CR-setting instruction and the CR-dependent branch instruction may be spaced far enough apart in the instruction stream to permit the actual CR bit value(s) upon which a CR-dependent conditional branch instruction depends to be received by CR branch prediction circuit 136. In that case, the path address "predicted" by CR branch prediction logic 136 will not be speculative, and BEU 92 will later resolve the CR-dependent conditional branch instruction as correctly predicted. Second, CR branch prediction circuit 136 may predict a speculative path of a CR-dependent conditional branch instruction utilizing a previous state of the CR bit(s) upon which the branch depends, and the state of the CR bit(s) is/are not modified by any intervening "recording" instruction. In this case, the path address predicted by CR branch prediction circuit 136 is truly speculative, but BEU 92 will later resolve the CR-dependent conditional branch instruction as correctly predicted. Finally, a recording instruction preceding a CR-dependent conditional branch instruction in program order may change the state of a CR bit utilized by CR branch prediction circuit 136 to predict a path address. In this last case, BEU 92 will resolve the CR-dependent conditional branch instruction as mispredicted, will supply the correct path address to IFAR 30, and will initiate a flush of all instructions in the mispredicted path and any subsequently predicted paths.

As has been described, the present invention provides a processor having an improved branch prediction unit. According to the present invention, the branch prediction unit predicts at least some conditional branch instructions based upon the type of the underlying condition upon which the branches depend or the instruction context adjacent the conditional branch instructions. In one embodiment, such conditional branch instructions include lock acquisition conditional branch instructions, which are typically predicted not-taken, and CR-dependent conditional branch instructions, which are predicted utilizing the most recently available version of the architected CR. The conditional branch instructions that will be predicted by reference to condition type or instruction context can advantageously be identified to the branch prediction unit by appropriately setting a prediction field in the conditional branch instructions utilizing hardware or software.

While the invention has been particularly shown and described with reference to a preferred embodiment, it will be understood by those skilled in the art that various changes in form and detail may be made therein without departing from the spirit and scope of the invention.

What is claimed is:

1. A processor comprising:
   i. At least one execution unit that executes sequential instructions,
   ii. A condition register, and
   iii. A branch prediction circuit that predicts a condition register-dependent branch instruction by reference to a potentially stale condition register value to produce a speculative instruction fetch address regardless of whether or not the condition register value has been recently updated, wherein said branch prediction circuit predicts said condition register-dependent branch instruction exclusive of a branch history table.

2. A data processing system, comprising:
   i. At least one execution unit that executes sequential instructions;
   ii. A condition register;
   iii. A branch prediction circuit that predicts a condition register-dependent branch instruction by reference to a potentially stale condition register value to produce a speculative instruction fetch address regardless of whether or not the condition register value has been recently updated;
   iv. An instruction cache to which said speculative instruction fetch address is supplied, wherein said branch prediction circuit predicts said condition register-dependent branch instruction exclusive of a branch history table.

3. A method of processing a branch instruction in a processor, said method comprising:
   i. In response to receipt of a condition register-dependent branch instruction, predicting a speculative execution path by reference to a potentially stale condition register value regardless of whether or not the condition register value has been recently updated, wherein said predicting comprises predicting said speculative execution path exclusive of a branch history table (BHT); and
   ii. Determining a speculative instruction fetch address for said speculative execution path.

* * * * *